(12) United States Patent
Connor et al.

(10) Patent No.: US 10,819,643 B2
(45) Date of Patent: *Oct. 27, 2020

(54) LOAD BALANCING SYSTEMS, DEVICES, AND METHODS

(71) Applicant: Intel Corporation, Santa Clara, CA (US)

(72) Inventors: Patrick L. Connor, Beaverton, OR (US); Parthasarathy Sarangam, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/282,843

(22) Filed: Feb. 22, 2019

(65) Prior Publication Data

US 2019/0190832 A1 Jun. 20, 2019

Related U.S. Application Data

(63) Continuation of application No. 15/468,835, filed on Mar. 24, 2017, now Pat. No. 10,243,856.

(51) Int. Cl.
*H04L 12/803* (2013.01)
*H04L 12/26* (2006.01)
(Continued)

(52) U.S. Cl.
CPC ........ *H04L 47/125* (2013.01); *H04L 43/0852* (2013.01); *H04L 43/16* (2013.01); *H04L 45/22* (2013.01); *H04L 45/38* (2013.01); *H04L 45/70* (2013.01); *H04L 47/283* (2013.01); *H04L 49/1515* (2013.01); *H04L 69/40* (2013.01)

(58) Field of Classification Search
CPC ... H04L 47/125; H04L 1/0003; H04L 1/1887; H04L 45/22; H04L 47/11
See application file for complete search history.

(56) References Cited

U.S. PATENT DOCUMENTS

| 7,496,661 B1 * | 2/2009 | Morford | ............ H04L 41/5025 |
| | | | 709/224 |
| 10,243,856 B2 | 3/2019 | Connor et al. | |

(Continued)

FOREIGN PATENT DOCUMENTS

| EP | 2950488 A1 | 12/2015 |
| WO | WO-2016119723 A1 | 8/2016 |

OTHER PUBLICATIONS

"U.S. Appl. No. 15/468,835, Corrected Notice of Allowability dated Dec. 19, 2018", 4 pgs.
"U.S. Appl. No. 15/468,835, Examiner Interview Summary dated Sep. 12, 2018", 3 pgs.
"U.S. Appl. No. 15/468,835, Non Final Office Action dated Jun. 14, 2018", 9 pgs.

(Continued)

*Primary Examiner* — Jung H Park
(74) *Attorney, Agent, or Firm* — Schwegman Lundberg & Woessner, P.A.

(57) ABSTRACT

Embodiments regard load balancing data on one or more network ports. A device may include processing circuitry, the processing circuitry to transmit a first packet of a first series of packets to a destination device via a first port, determine a time gap between a first packet and a second packet of the first series of packets, and in response to a determination that the time gap is greater than a time threshold, transmit the second packet to the destination device via a second port.

20 Claims, 4 Drawing Sheets

(51) Int. Cl.
*H04L 12/721* (2013.01)
*H04L 12/707* (2013.01)
*H04L 12/841* (2013.01)
*H04L 29/14* (2006.01)
*H04L 12/933* (2013.01)

(56) References Cited

U.S. PATENT DOCUMENTS

| | | |
|---|---|---|
| 2011/0096668 A1 | 4/2011 | Bloch et al. |
| 2011/0280137 A1* | 11/2011 | Bockwoldt ........... H04L 43/067 370/252 |
| 2014/0119193 A1* | 5/2014 | Anand .................. H04L 47/125 370/237 |
| 2015/0124611 A1 | 5/2015 | Attar et al. |
| 2018/0278530 A1 | 9/2018 | Connor et al. |

OTHER PUBLICATIONS

"U.S. Appl. No. 15/468,835, Notice of Allowance dated Nov. 7, 2018", 7 pgs.
"U.S. Appl. No. 15/468,835, Response filed Sep. 6, 2018 to Non Final Office Action dated Sep. 6, 2018", 8 pgs.
"European Application Serial No. 18154431.3, Extended European Search Report dated May 14, 2018", 13 pgs.
"European Application Serial No. 18154431.3, Communication Pursuant to Article 94(3) EPC dated Jun. 4, 2019", 7 pgs.
"European Application Serial No. 18154431.3, Response filed Mar. 26, 2019 to Extended European Search Report dated May 14, 2018", 14 pgs.
"European Application Serial No. 18154431.3, Response filed Dec. 11, 2019 to Communication Pursuant to Article 94(3) EPC dated Jun. 4, 2019", 7 pgs.

* cited by examiner

LOAD BALANCING SYSTEMS, DEVICES, AND METHODS

CROSS-REFERENCE TO RELATED APPLICATION

This application is a continuation of U.S. Pat. No. 10,243,856, filed Mar. 24, 2017, which is incorporated by reference herein in its entirety.

TECHNICAL FIELD

Embodiments discussed herein regard systems, devices, and methods for determining a path through which to provide data from a source device to a destination device.

BACKGROUND

Networks can include multiple paths through which data from a source device may be provided to a destination device. These paths may be different in terms of one or more attributes (latency, bandwidth, load, or the like). Such variation in attributes may be evidence that a load on a first path is different from a load on a second path. A path with a greater load may include a path traversal time that is greater than a path traversal time of a path with a lesser load.

DESCRIPTION OF EMBODIMENTS

Figure 1:
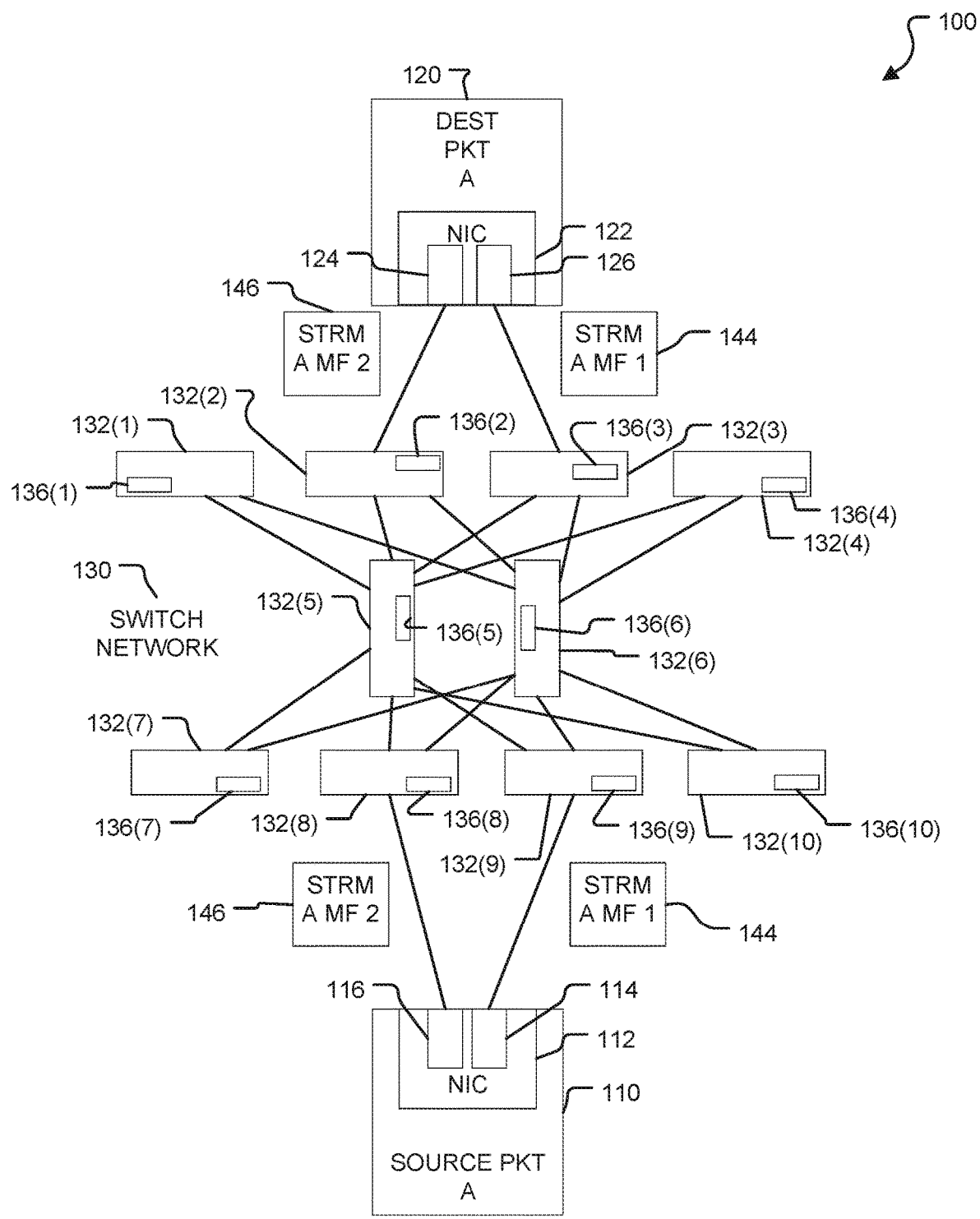
FIG. 1 illustrates, by way of example, a block diagram of an embodiment of a network.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Network traffic may be bursty. There have been multiple studies that examine the reason for this phenomenon. Transmit Control Protocol (TCP) window exhaustion is one simple example that can cause traffic bursts, but it is not the only source of this behavior. A burst of packets is sometimes called a "packet train." Packet trains are a group of packets in the same flow (headed to the same destination) and they may have a specified maximum inter-packet time gap. A packet train includes a burst of packets from the same source and heading to a same destination. When a time between two packets exceeds some inter-packet gap time, the packets are said to belong to different packet trains.

Packet trains are sometimes referred to as microflows herein. In other instances, microflow may mean a very short lived connection. In the context of this application, a microflow is a series of packets within an established connection, such as a packet train. An inter-microflow time parameter may be configurable by a user, with values dependent on the frequency with which applications use the network. An inter-packet arrival time (the packet gap) of a microflow may be a system parameter, such as can depend on the network hardware and/or software.

Some datacenters may be connected so as to minimize latency and allow high bandwidth communications. One of the aspects to this datacenter architecture is that all the sleds will have a specified number of respective connections to different switches. A sled is a device that may be situated in a rack of sleds. Each sled may provide compute and/or communication capability. Connections may be provided by a NIC that includes a number of ports equal to the number of connections. Any given packet could be sent via any of the ports. However, it may be important that packets in the same flow arrive in the same order. If packets in the same flow are sent via different ports, this may cause the packets to arrive at their destination out-of-order. This could be because of different latencies or different congestion levels that the packets encounter on the different paths. Out-of-order packet arrival may result in unnecessary retransmission. Retransmission adds latency and unnecessarily consumes bandwidth. To avoid this, packets in the same flow (connection) are currently sent via the same port.

Traffic may be divided by flow or connection between the ports of the NIC in one of the following general methods: 1. deterministic, such as can be based on a defined forwarding table; 2. random flow distribution, such as can be hash value based; and 3. dynamic load balancing, such as can be congestion based. Embodiments discussed herein regard dynamic load balancing.

A deterministic flow follows a pre-defined path that is defined in a memory, such as may include a routing table or the like. A random flow distribution may determine a hash value for a packet, compare the hash value to a predetermined hash table, and forward the packet to a port based on an entry in the hash table. A dynamic load balancing technique may include determining an attribute, such as traffic on a path, and altering a next packet path based on the attribute.

The deterministic and random distribution methods are static and may not allow for rebalancing even when the bandwidth may be improved via rebalancing. Dynamic load balancing (DLB), is considered herein. However, out-of-order packets can occur and it may be advantageous to avoid such out-of-order packets, such as to reduce processing time and/or errors after receiving the packets.

Paths between the source device and the destination device can be long or short lived. When a given sled has short lived connections, it can be easy for the sled using DLB to balance traffic on its ports. When new connections are established, they can be assigned to a currently least loaded port. When some or all of the connections are longer lived, this simple method may not be sufficient.

For some traffic patterns, "elephant flows" (e.g., large, continuous flows) can greatly impact the bandwidth management. Elephant flows may consume significant bandwidth and may be long lived. It is not readily apparent when a connection is established how long the connection life will be, nor how much throughput the connection will need. Given this, it is possible that any of the above methods randomly place an excessive number of elephant flows on the same port, thereby saturating bandwidth on that port even while bandwidth on other ports is still available. This worst case is unlikely, but it is also unlikely that all the connections will end up distributed in a manner that maximally utilizes the ports of the NIC.

If, for example, each port on the NIC has a bandwidth of 50 Mbps, then the ports of the NIC have 200 Mbps of aggregate bandwidth (assuming the NIC has four ports). Deterministic or random flow distribution may place two demanding flows on the same port. These flows would compete with each other and be limited to a total of only 50 Mbps collectively even when the other three ports of the NIC were lightly loaded.

Similarly, DLB techniques may make a bandwidth management decision when placing these two flows on the same port would have been the right decision. Then short lived flows on other ports finish their transfers and are torn down. However, the two elephants are now tied to the same port and may not be moved even as bandwidth becomes available on other ports.

What is needed is a DLB method to reassign which port a flow is using without causing out of order packets. Systems, devices, and methods discussed herein may monitor flows and look for gaps between packets being sent. If the gap is large enough, then this allows subsequent packets to be transmitted on any of the ports on the system (e.g., NIC, a multi-system on chip (SOC) system, or the like). This allows for opportunistic rebalancing while avoiding packet reordering.

FIG. 1 illustrates, by way of example, a block diagram of an embodiment of a network 100. The network 100 as illustrated includes a source device 110 and a destination device 120. The source device 110 is the device from which a packet originates (a packet source). The destination device 120 is the device to which the packet is to be transmitted. Between the source device 110 and the destination device 120 is a switch network 130. A first packet microflow 144 ("STRM A MF 1") and a second packet microflow 146 ("STRM A MF 2") flow from the source device 110 to the destination device 120.

The source device 110 as illustrated includes a network interface controller (NIC) 112. The NIC 112 (e.g., along with the switch network 130) connects the source device 110 to one or more other devices of the network. The NIC 112 is a hardware component. Some other common terms for a NIC may include host fabric interface (HFI), network interface card, network adapter, local area network (LAN) adapter, and physical network interface. The NIC 112 includes electric and electronic components, such as can include processing circuitry (see FIG. 2). The NIC 112 includes a plurality of ports 114 and 116. The ports 114 and 116 are configured to transfer packets to, or receive packets from, the switch network 130. The NIC 112 may be replaced with a multi-SOC system or other interface device or system.

The destination device 120 as illustrated includes a network interface controller (NIC) 122. The NIC 122 (e.g., along with the switch network 130) connects the destination device 120 to one or more other devices of the network 100. The NIC 122 may be similar to the NIC 112. The NIC 112 includes a plurality of ports 124 and 126. The ports 124 and 126 are configured to transfer packets to, or receive packets from the switch network 130.

The switch network 130 as illustrated includes a plurality of switches 132(1), 132(2), 132(3), 132(4), 132(5), 132(6), 132(7), 132(8), 132(9), and 132(10). The switch network 130 as illustrated includes ten switches 132(1)-132(10), however the switch network 130 can include more or fewer switches. Each of the switches 132(1)-132(10) may include one or more queues 136(1), 136(2), 136(3), 136(4), 136(5), 136(6), 136(7), 136(8), 136(9) and 136(10), respectively.

While the queues 136(1)-136(10) are illustrated as being part of the switches 132(1)-132(10), respectively, the queues 136(1)-136(10) may be separate from and coupled to the switches 132(1)-132(10). For example, the NIC 112 and/or 122 may include one or more queues.

A queue provides an asynchronous communication protocol, such that the sender and receiver of a message do not need to interact with the queue at the same time. A queue generally receives data, temporarily stores the data, and provides the data to be transmitted in a pre-determined order. Many queues provide data in a first in, first out (FIFO) manner, while others may prioritize data based on attributes of the data (e.g., metadata or the data itself), or have some other technique of ordering the transmission of received data.

In one or more embodiments, the switch network 130 can include a Clos network. A Clos network may be a multistage circuit switching network including an ingress stage, a middle stage, and an egress stage. Each stage includes a number of switches. Each switch of the ingress stage may be coupled to each switch of the middle stage and each switch of the egress stage may be coupled to each switch of the middle stage. The ingress stage includes r switches. Each switch of the ingress stage includes n inputs. Each switch of the ingress stage switch includes m outputs. There are m switches in the middle stage. Each switch in the middle stage includes r inputs and r outputs. There are r switches in the egress stage. Each switch of the egress stage has m inputs and in outputs. In the example of FIG. 1, in equals two, m equals two, and r equals four.

The switches 132(1)-132(10) in the switch network 130 can include multiple ports (e.g., input ports, output ports, and/or bi-directional ports), such that any input on any port can be switched to any port. The switches 132(1)-132(10) may be network switches that forward data to a single device that is to receive it. Some switches include routing functionality for packet forwarding.

In the network 100 of FIG. 1, the source device 110 may transmit a data steam "A" (e.g., a data stream in accord with TCP) to the destination device 120. Stream A has two microflows 144 and 146 with a time gap between them (see FIG. 3). Each of the microflows 144 and 146 can include a portion of a data stream from the source device 110. Each of the microflows 144 and 146 is comprised of sequential packets. The time gap between the microflows 144 and 146 is a specific instance of a gap between packets, specifically a gap between a last packet of the microflow 144 and a first packet of the microflow 146.

Figure 2:
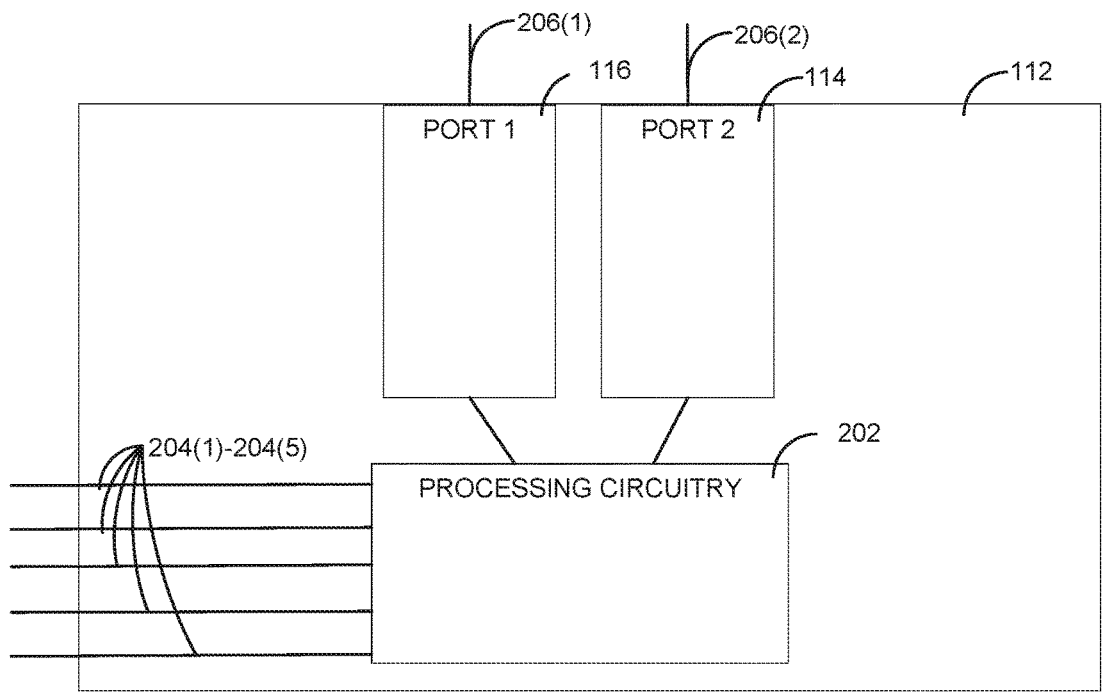
FIG. 2 illustrates, by way of example, an exploded view diagram of an embodiment of a network interface controller (NIC) of FIG. 1.

FIG. 2 illustrates, by way of example, an exploded view diagram of an embodiment of the NIC 112. The NIC 122 can include similar components to the NIC 112. The NIC 112 as illustrated includes processing circuitry 202, inputs 204(1), 204(2), 204(3), 204(4), and 204(5), the ports 114 and 116 and output links 206(1) and 206(2).

The processing circuitry 202 may include electric or electronic components, such as can include one or more transistors, resistors, capacitors, inductors, diodes, regulators (e.g., current, voltage, and/or power regulators), multiplexers, logic gates, switches, buffers, amplifiers, oscillators, modulators, demodulators, interconnects (e.g., wired or wireless signal transfer mechanisms), antennas, radios (receive and/or transmit radios), or the like. The processing circuitry 202 can include an application specific integrated circuit (ASIC), a programmable gate array (e.g., a programmable chip, such as can include a field programmable gate array (FPGA)), central processing unit (CPU), graphics processing unit (GPU), or the like. The processing circuitry 202 can be configured as a state machine configured to receive data on the inputs 204(1)-204(5) and produce streams of packets (e.g., microflows) to the ports 114 and 116 and to the outputs 206(1) and 206(2).

Figure 3:
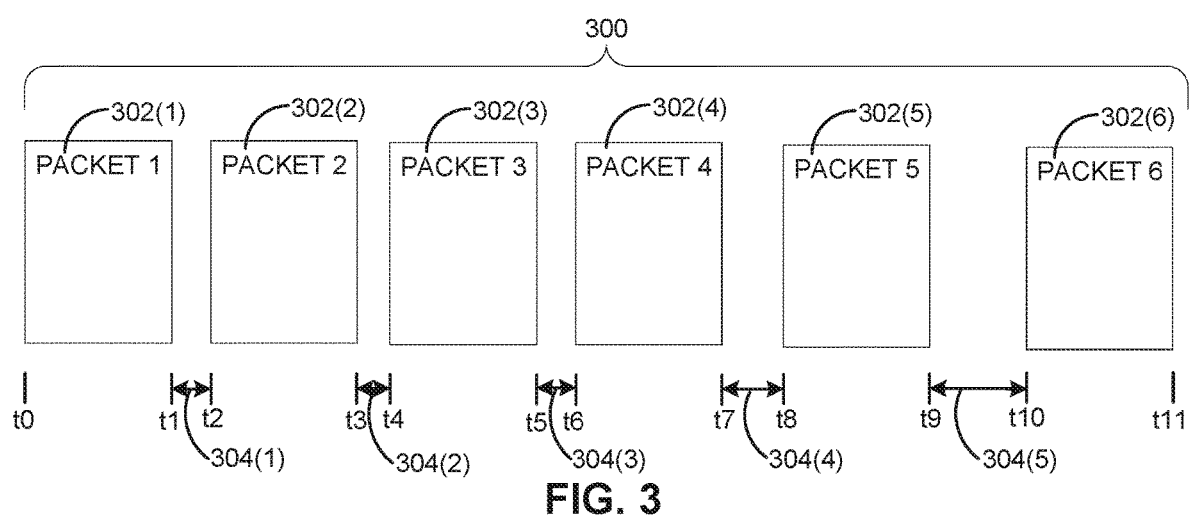
FIG. 3 illustrates, by way of example, a logical diagram of a series of packets.

The processing circuitry 202 may determine a time gap between packets (e.g., a packet gap) of the microflows 144 and 146, such as to determine when the time between packets may be greater than (or equal to) a time threshold. FIG. 3 illustrates, by way of example, a logical diagram of a series of packets 300. Each packet 302(1), 302(2), 302(3), 302(4), 302(5), and 302(6) includes a start time and stop time. A difference between a stop time (e.g., t1, t3, t5, t7, t9, and t11 of FIG. 3) of a first packet and a start time (e.g., t0, t2, t4, t6, t8, and t10 of FIG. 3) of the next packet (consecutive packet) in the series of packets 300 defines a time gap 304(1), 304(2), 304(3), 304(4), and 304(5), respectively. The processing circuitry 202 can determine the times t0-t11 and/or time gaps 304(1)-304(5) and determine which port 114 or 116 data from the input(s) 204(1)-204(5) is to be forwarded. Such a routing decision can be performed by comparing the time gap 304(1)-304(5) to a time threshold. In response to determining the time gap 304(1)-304(5) is greater than (or equal to), the time threshold, the processing circuitry 202 may switch the port 116 or 114 to which the data may be forwarded.

For example, assume the processing circuitry 202 has provided the packet 302(1) to the port 114. The processing circuitry 202 may determine a time from a completion of transmitting or receiving the packet 302(1) (t1 of FIG. 3) to a beginning of transmitting or receiving the packet 302(2) (t2 of FIG. 3). This can be accomplished in a variety of ways, such as by counting a number of clock cycles, such as of an oscillator of the processing circuitry 202, or recording the time t1 and subtracting that from a recorded time t2. The processing circuitry 202 may then compare the determined time gap 304(1) to the time threshold. The time threshold can be expressed in terms of seconds, sub-seconds, oscillator cycles, or the like. In response to determining the time gap 304(1) is less than (or equal to) the time threshold, the processing circuitry 202 can provide the packet 302(2) to the same port 114 that it provided the packet 302(1). In response to determining the time gap 304(1) is greater than (or equal to) the time threshold, the processing circuitry 202 can provide the packet 302(2) to another port (port 116 in the embodiments of FIGS. 1 and 2).

The time threshold can be set based on hardware attributes, such as can be determined empirically, such as by experiment, and/or by reviewing a data sheet that indicates a latency of a device or link. An entity may attempt a first time threshold, allow the system to operate, and realize that a second stream of packets may reach a destination before a first stream of packets is fully received. In such an instance, such as to help alleviate collisions, the time threshold can be increased, such as to help increase the chances that the second packet stream is received only after the entirety of the first packet stream is received. The destination device 120, in response to receiving a packet out of order, can issue a communication to the source device 110 that indicates that a packet was received out of order. The processing circuitry 202 may, in response to receiving the out of order communication, increase the time threshold.

In one or more embodiments, the time threshold can be set to a delta between a time it takes for (1) data to travel from the port 114 to the destination device 120 and (2) data to travel from the port 116 to the destination device 120. If the delta is negative or less than a minimum latency, the time threshold can be set to the minimum latency.

In one or more embodiments, the time threshold can be determined based on a time it takes data to travel from the port 114 or 116 to the destination device 120. The time it takes for the data to travel from the port 114 or 116 to the destination device 120 can be estimated based on a time between transmission of the packet and a time an acknowledge (ACK) or negative ACK (NACK) packet is received from the destination device 120. The time threshold can be set to half the time between transmission of the packet and a time the ACK/NACK is received.

Attributes (sometimes referred to as telemetry or local parameter data) of the ports 114 and 116 to which the streams of packets may include a bandwidth, latency, packet loss rate, error rate, or the like. Attributes of a traversal path from the source device 110 to the destination device 120 can include a bandwidth, a traversal path transit time, a packet loss rate, error rate, congestion, queue depth (a number of items stored in a queue of a switch 132(1)-132(10), or the like, that will be transmitted prior to next received data). The traversal path transit time can include a time from a packet being received and/or detected at the NIC 112 of the source device 110 to a time the same packet is received and/or detected at the NIC 122. In one or more embodiments, the traversal path transit time includes a time it takes the processing circuitry 202 to provide the packet to one of the ports 114 and 116, a time it takes the packet to traverse the switch network 130, and/or a time it takes the packet to be provided to processing circuitry of the destination device 120 from one of the ports 124 and 126.

A packet loss rate may be a value indicating a number of packets dropped per a set number packets transmitted. For example, a packet loss rate of 0.001 indicates that one in one thousand packets is from the port does not make it to the destination. An error rate indicates how many packets of a set number of packets include an error. For example, an error rate of 0.01 indicates that data in a one of every one hundred packets from the port includes an error in the data. A congestion on a path indicates how much traffic is currently on the port. For example, a congestion may be a number between zero and two-hundred fifty-five (or other maximum number), or one of a hierarchy of values, that indicates how backed up a path to the destination device 120 is. The queue depth indicates how full or empty a queue is, such as to indicate how much data is stored on the queue or how much storage is available on the queue. The queue depth may indicate an amount of packets to be transmitted before a next packet.

In one or more embodiments, a NIC 112 and 122 includes more than two ports. Each port of the NIC 112 can be associated with a cost. The cost of the port can be a sum, such as can include a weighted sum, or other combination of one or more of the attributes associated with the port or a traversal path that includes the port. In determining which port to which to switch a packet flow, the cost of the port can be used. For example, the processing circuitry 202 can switch the packet flow to a port that includes a cost that is less than, greater than, or equal to, the cost of the port to which the packets are being provided. It may switch to a port that includes a cost that is greater than if packets are arriving out of order and packet transmission to the destination device 120 is to be slowed down.

Figure 4:
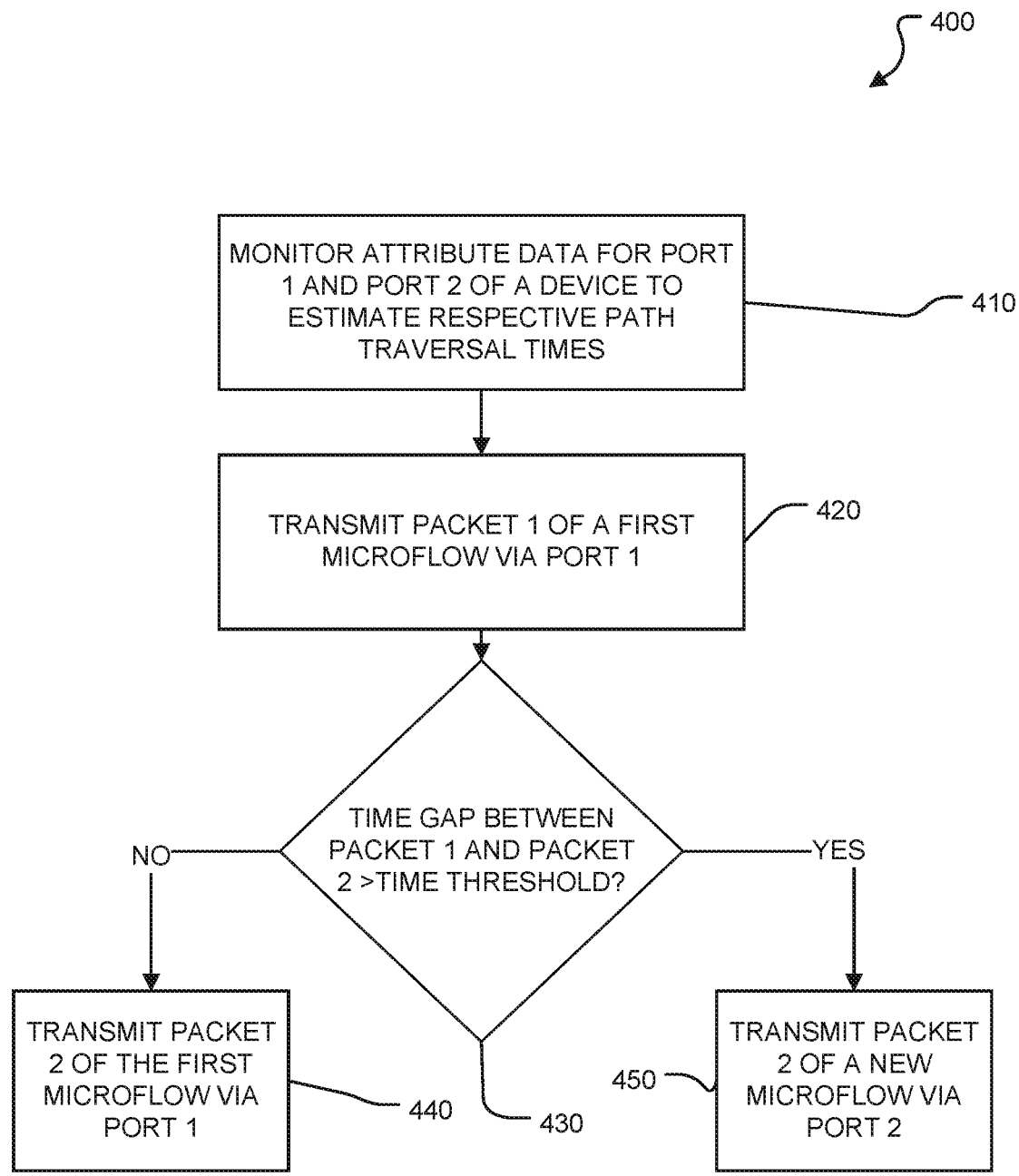
FIG. 4 illustrates, by way of example, a block diagram of an embodiment of a method for load balancing.

FIG. 4 illustrates, by way of example, a block diagram of an embodiment of a method 400 for load balancing. The method 400 can be performed by the processing circuitry 202 or firmware, device driver or other machine-readable medium. The method 400 as illustrated includes: monitoring one or more attributes for port 1 and port 2 of a device to estimate respective path traversal times, at operation 410; transmit packet 1 of a first microflow via port 1, at operation 420; determine whether a time gap between packet 1 and packet 2 is greater than a time threshold, at operation 430; in response to a determination that the time gap between packet 1 and packet 2 is not greater than the time threshold, transmit packet 2 of the first microflow via port 1, at operation 440; in response to a determination that the time gap between packet 1 and packet 2 is greater than the time threshold, transmit packet 2 in a new microflow via port 2, at operation 450. In one or more embodiments, the operation 450 can be performed after a NACK/ACK is received regarding packet 1.

The method 400 may further include estimating a first transmission time to a destination device associated with a first port of a source device. The operation 430 may be performed for each port of the NIC. The method 400 may further include, in response to a transmission gap on a second port of the source device after transmission of the first packet that is greater than the estimated first transmission time, transmitting a second packet of a second microflow to the destination device via the second port.

The operation 410 may include estimating the first transmission time based on first attribute data. The attribute data may include one or more attributes, such as congestion information regarding traffic on a path between the port of the source device and the destination device. The attribute data may include queue (e.g., cache) information of memories along the path between the port of the source device and the destination device. The queue information can include a depth of data in the queue (e.g., how much data is currently in the queue). The processing circuitry 202 can forward the packet along a path that includes less data in the queues, such as in response to determining the time gap is greater than or equal to the time threshold. The operation 410 may include measuring a time between transmission of a packet to the destination device and receipt of an associated acknowledgement message.

The method 400 may further include increasing the estimated first transmission time in response to an out of order message from the destination device. The method 400 may further include estimating a second transmission time to the destination device associated with a second port of the source device. The method 400 may further include, in response to a transmission gap on the first port after transmission of the second packet that is greater than the estimated second transmission time, transmitting a third packet of a second microflow to the destination device via the second port.

The operation 420 may include transmitting the first packet via a network interface controller of the source device. The operation 420 may include transmitting the first packet over a Clos network. The method 400 may further include, in response to receiving an acknowledgment associated with the first packet and before the second packet has been transmitted over via the second port, transmitting the second packet via the first port.

Embodiments may be implemented in NIC hardware, firmware, and/or a device driver. Embodiments may not require a change to a host operating system or protocol stack. The traffic (e.g., TCP traffic) that is provided from the source device to the destination device can remain unmodified.

An aspect of one or more embodiments is determining an adequate gap time to allow micro-flow port switching. There are multiple ways this can be accomplished. The simplest way would be to start with a small amount such as 1500 byte times. If out-of-order packets occur, increase the required gap time.

Another method can include determining a required gap length, such as by collecting attribute data from the ports and/or the various path switches and queues. This can be used to determine the queue depths and congestion levels on the paths between the source and the destination device. The attribute data may be used estimate various path traversal times and the required gap time can then be set to the delta of the current to new path traverse times.

Figure 5:
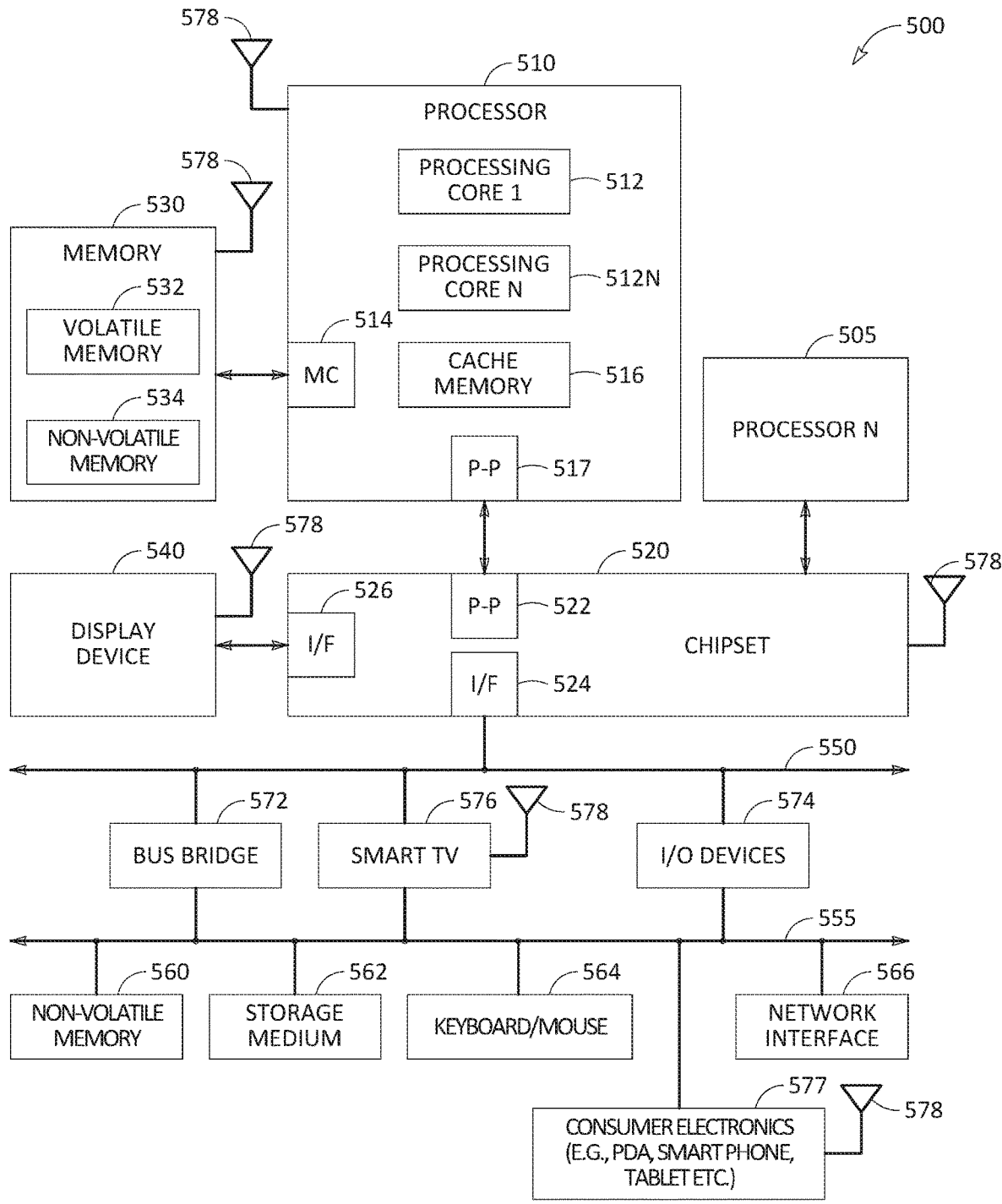
FIG. 5 illustrates, by way of example, a logical block diagram of an embodiment of a system.

FIG. 5 illustrates, by way of example, a logical block diagram of an embodiment of a system. For example, FIG. 5 depicts an example of an electronic device (e.g., system) including devices or components that can be included in the source device 110, destination device 120, NIC 112 and/or 122, the switch 132(1)-132(10, the queue 136(1)-136(10), the processing circuitry 202, or other device discussed herein. In one embodiment, system 500, such as can include an example of the source device and/or the destination device includes, but is not limited to, a desktop computer, a laptop computer, a netbook, a tablet, a notebook computer, a personal digital assistant (PDA), a server, a workstation, a cellular telephone, a mobile computing device, a smart phone, an Internet appliance or any other type of computing device. In some embodiments, the system 500 is a system on a chip (SOC) system.

In one embodiment, processor 510 has one or more processing cores 512 and 512N, where 512N represents the Nth processor core inside processor 510 where N is a positive integer. In one embodiment, system 500 includes multiple processors including 510 and 505, where processor 505 has logic similar or identical to the logic of processor 510. In some embodiments, processing core 512 includes, but is not limited to, pre-fetch logic to fetch instructions, decode logic to decode the instructions, execution logic to execute instructions and the like. In some embodiments, processor 510 has a cache memory 516 to cache instructions and/or data for system 500. Cache memory 516 may be organized into a hierarchal structure including one or more levels of cache memory.

In some embodiments, processor 510 includes a memory controller 514, which is operable to perform functions that enable the processor 510 to access and communicate with memory 530 that includes a volatile memory 532 and/or a non-volatile memory 534. In some embodiments, processor 510 is coupled with memory 530 and chipset 520. Processor 510 may also be coupled to a wireless antenna 578 to communicate with any device configured to transmit and/or receive wireless signals. In one embodiment, the wireless antenna interface 578 operates in accordance with, but is not limited to, the IEEE 802.11 standard and its related family, Home Plug AV (HPAV), Ultra Wide Band (UWB), Bluetooth, WiMax, or any form of wireless communication protocol.

In some embodiments, volatile memory 532 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. Non-volatile memory 534 includes, but is not limited to, flash memory, phase change memory (PCM), read-only memory (ROM), electrically erasable programmable read-only memory (EEPROM), or any other type of non-volatile memory device.

Memory 530 stores information and instructions to be executed by processor 510. In one embodiment, memory 530 may also store temporary variables or other intermediate information while processor 510 is executing instructions. In the illustrated embodiment, chipset 520 connects with processor 510 via Point-to-Point (PtP or P-P) interfaces 517 and 522. Chipset 520 enables processor 510 to connect to other elements in system 500. In some embodiments of the invention, interfaces 517 and 522 operate in accordance with a PtP communication protocol such as the Intel® QuickPath Interconnect (QPI) or the like. In other embodiments, a different interconnect may be used.

In some embodiments, chipset 520 is operable to communicate with processor 510, 505N, display device 540, and other devices 572, 576, 574, 560, 562, 564, 566, 577, etc. Chipset 520 may also be coupled to a wireless antenna 578 to communicate with any device configured to transmit and/or receive wireless signals.

Chipset 520 connects to display device 540 via interface 526. Display 540 may be, for example, a liquid crystal display (LCD), a plasma display, cathode ray tube (CRT) display, or any other form of visual display device. In some embodiments of the invention, processor 510 and chipset 520 are merged into a single SOC. In addition, chipset 520 connects to one or more buses 550 and 555 that interconnect various elements 574, 560, 562, 564, and 566. Buses 550 and 555 may be interconnected together via a bus bridge 572. In one embodiment, chipset 520 couples with a non-volatile memory 560, a mass storage device(s) 562, a keyboard/mouse 564, and a network interface 566 via interface 524 and/or 504, smart TV 576, consumer electronics 577, etc.

In one embodiment, mass storage device 562 includes, but is not limited to, a solid state drive, a hard disk drive, a universal serial bus flash memory drive, or any other form of computer data storage medium. In one embodiment, network interface 566 is implemented by any type of well-known network interface standard including, but not limited to, an Ethernet interface, a universal serial bus (USB) interface, a Peripheral Component Interconnect (PCI) Express interface, a wireless interface and/or any other suitable type of interface. In one embodiment, the wireless interface operates in accordance with, but is not limited to, the IEEE 802.11 standard and its related family, Home Plug AV (HPAV), Ultra Wide Band (UWB), Bluetooth, WiMax, or any form of wireless communication protocol.

While the modules shown in FIG. 5 are depicted as separate blocks within the system 500, the functions performed by some of these blocks may be integrated within a single semiconductor circuit or may be implemented using two or more separate integrated circuits. For example, although cache memory 516 is depicted as a separate block within processor 510, cache memory 516 (or selected aspects of 516) can be incorporated into processor core 512.

The device 500 of FIG. 5 illustrates one configuration. For example, each processing core 512 may include its own dedicated memory 516. In another example, each processing core 512 may include its own dedicated peripheral component interconnect (PCI) slot. In another example, each processing core 512 may communicate with other processing cores via an interconnect, such as a QuickPath Interconnect (QPI) or a UltraPath Interconnect (UPI).

To better illustrate the methods and device disclosed herein, a non-limiting list of embodiments is provided here:

Example 1 may include a device comprising processing circuitry, the processing circuitry to transmit a first packet of a first series of packets to a destination device via a first port, determine a time gap between a first packet and a second packet of the first series of packets, and in response to a determination that the time gap is greater than a time threshold, transmit the second packet to the destination device via a second port.

In Example 2, Example 1 may further include, wherein the processing circuitry is further to estimate a first transmission time to a destination device associated with the first port.

In Example 3, Example 2 may further include, wherein the processing circuitry is further to estimate a second transmission time to the destination device associated with the second port.

In Example 4, Example 3 may further include, wherein the first and second transmission times are estimated based on first attribute data and second attribute data, respectively.

In Example 5, Example 4 may further include, wherein the first time threshold is greater than, or equal to, a difference between the estimated first transmission time and the estimated second transmission time, if the second transmission time is less than the first transmission time.

In Example 6, at least one of Examples 2-5 may further include, wherein to estimate the first transmission time to the destination device associated with the first port based on first attribute data includes the processing circuitry to measure a time between transmission of a packet to the destination device and receipt of an associated acknowledgement message.

In Example 7, at least one of Examples 2-6 may further include, wherein the processing circuitry is further to determine a time gap between the second packet and a third packet, and in response to a determination that the time gap is greater than a second time threshold, transmit the third packet to the destination device via the first port.

In Example 8, Example 7 may further include, wherein the second time threshold is a difference between the second transmission time and the first transmission time if the first transmission time is less than the second transmission time and a minimum time threshold if the second transmission time is less than the first transmission time.

In Example 9, at least one of Examples 2-8 may further include, wherein first attribute data includes at least one of congestion information and queue depths along a transmission path between the computer device and the destination device through the first port.

In Example 10, at least one of Examples 1-9 may further include, wherein the processing circuitry is further to increase the first time threshold in response to an out of order message from the destination device.

In Example 11, at least one of Examples 1-10 may further include a network interface controller having the first port and the second port.

In Example 12, at least one of Examples 1-11 may further include, wherein the packets are transmitted over a Clos network coupled between the computer device and the destination device.

In Example 13, at least one of Examples 1-12 may further include, wherein the processing circuitry is further to, in response to receiving an acknowledgment on the first port and associated with the first packet and before the second packet has been transmitted via the second port, transmit the second packet via the first port.

Example 14 may include a method to balance a load on a network, the method comprising estimating a first transmission time to a destination device associated with a first port of a source device, transmitting a first packet of a first series of packets to the destination device via the first port, and in response to a transmission gap on a second port of the source device, after transmission of the first packet, being greater than the estimated first transmission time, transmitting a second packet of a second series of packets to the destination device via the second port.

In Example 15, Example 14 may further include, wherein estimating the first transmission includes estimating the first transmission time based on first attribute data.

In Example 16, Example 15 may further include, wherein first attribute data includes at least one of congestion information and queue depths along a transmission path.

In Example 17, at least one of Examples 14-16 may further include increasing the estimated first transmission time in response to an out of order message from the destination device.

In Example 18, at least one of Examples 14-17 may further include, wherein estimating the first transmission time to the destination device associated with the first port based on first attribute data includes measuring a time between transmission of a packet to the destination device and receipt of an associated acknowledgement message.

In Example 19, at least one of Examples 14-18 may further include estimating a second transmission time to the destination device associated with a second port of the source device, and in response to a transmission gap on the first port after transmission of the second packet that is greater than the estimated second transmission time, transmitting a third packet to the destination device via the second port.

In Example 20, at least one of Examples 14-19 may further include transmitting the first packet via a network interface controller of the source device.

In Example 21, at least one of Examples 14-20 may further include, wherein the first packet is transmitted over a Clos network.

In Example 22, at least one of Examples 14-21 may further include, in response to receiving an acknowledgment associated with the first packet and before the second packet has been transmitted over via the second port, transmitting the second packet via the first port.

Example 23 may include at least one non-transitory machine-readable medium including instructions that, when executed by processing circuitry of a source device, cause the processing circuitry to perform operations comprising transmitting a first packet of a first series of packets to a destination device via a first port, determining a time gap between the first packet and a second packet of the first series of packets, and in response to a determination that the time gap is greater than a time threshold, transmitting the second packet to the destination device via a second port.

In Example 24, Example 23 may further include, wherein the operations further comprise estimating a first transmission time to a destination device associated with the first port.

In Example 25, Example 24 may further include, wherein the operations further comprise estimating a second transmission time to the destination device associated with the second port.

In Example 26, Example 25 may further include, wherein the first and second transmission times are estimated based on first attribute data and second attribute data, respectively.

In Example 27, Example 26 may further include, wherein the first time threshold is (1) greater than, or equal to, a difference between the estimated first transmission time and the estimated second transmission time, if the second transmission time is less than the first transmission time or (2) a minimum time threshold if the estimated second transmission time is less than the estimated first transmission time.

In Example 28, at least one of Examples 24-27 may further include, wherein estimating the first transmission time to the destination device associated with the first port based on first attribute data includes measuring a time between transmission of a packet to the destination device and receipt of an associated acknowledgement message.

In Example 29, at least one of Examples 24-28 may further include, wherein the operations further comprise determining a time gap between the second packet and a third packet, and in response to a determination that the time gap is greater than a second time threshold, transmitting the third packet to the destination device via the first port.

In Example 30, Example 29 may further include, wherein the second time threshold is (1) a difference between the second transmission time and the first transmission time if the estimated first transmission time is less than the estimated second transmission time and a minimum time threshold if the estimated second transmission time is less than the estimated first transmission time or (2) a minimum time threshold if the estimated second transmission time is less than the estimated first transmission time.

In Example 31, at least one of Examples 24-30 may further include, wherein first attribute data includes at least one of congestion information and queue depths along a transmission path between the computer device and the destination device through the first port.

In Example 32, at least one of Examples 23-31 may further include, wherein the operations further comprise increasing the first time threshold in response to an out of order message from the destination device.

In Example 33, at least one of Examples 23-32 may further include, wherein the operations further comprise, in response to receiving an acknowledgment on the first port and associated with the first packet and before the second packet has been transmitted via the second port, transmitting the second packet via the first port.

In Example 34, at least one of Examples 1-33 may further include, wherein the first and second packets are consecutive packets.

These examples are intended to provide non-limiting examples of the present subject matter-they are not intended to provide an exclusive or exhaustive explanation. The detailed description above is included to provide further information about the present devices, and methods.

The above detailed description includes references to the accompanying drawings, which form a part of the detailed description. The drawings show, by way of illustration, specific embodiments in which the disclosure can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the disclosure should be determined with reference to the appended claims, along with the full scope of equivalents to which such claims are entitled.

What is claimed is:

1. A source device to balance a load on a network, the device comprising a first port, a second port, and processing circuitry to:
   estimate a first transmission time to a destination device associated with the first port;
   transmit a first packet of a first series of packets to the destination device via the first port;
   in response to a transmission gap on the second port of the source device, after transmission of the first packet, being greater than the estimated first transmission time, transmitting a second packet of a second series of packets to the destination device via the second port; and
   increasing the estimated first transmission time in response to an out of order message from the destination device.

2. The device of claim 1, wherein the processing circuitry is further to estimate the first transmission time includes estimating the first transmission time based on first attribute data.

3. The device of claim 2, wherein the first attribute data includes at least one of congestion information and queue depths along a transmission path.

4. The device of claim 1, wherein estimation of the first transmission time to the destination device associated with the first port based on first attribute data includes measuring a time between transmission of a packet to the destination device and receipt of an associated acknowledgement message.

5. The device of claim 1, wherein the processing circuitry is further to:
   estimate a second transmission time to the destination device associated with a second port of the source device; and
   in response to a transmission gap on the first port after transmission of the second packet that is greater than the estimated second transmission time, transmit a third packet to the destination device via the second port.

6. The device of claim 1, wherein the processing circuitry is further to:
   determine a time gap between the second packet and a third packet; and
   in response to a determination that the time gap is greater than a second time threshold, transmit the third packet to the destination device via the first port.

7. The device of claim 6, wherein, the processing circuitry is further to, in response to a determination that the second transmission time is less than the first transmission time, to set the second time threshold as a minimum time threshold, and, in response to a determination that the first transmission time is less than the second transmission time, to set the second time threshold to a difference between the second transmission time and the first transmission time.

8. The device of claim 5, wherein the processing circuitry, in response to a determination that the second transmission time is less than the first transmission time, to set the first time threshold to a difference between the estimated first transmission time and the estimated second transmission time.

9. The device of claim 1, wherein the processing circuitry is further to, in response to receiving an acknowledgment associated with the first packet and before the second packet has been transmitted over via the second port, transmit the second packet via the first port.

10. The device of claim 1, wherein the processing circuitry is further to, in response to receiving an acknowledgment on the first port and associated with the first packet and before the second packet has been transmitted via the second port, transmit the second packet via the first port.

11. A device to balance a load on a network, the device comprising processing circuitry to:
    transmit a first packet of a first series of packets to a destination device via a first port;
    determine a time gap between the first packet and a second packet of the first series of packets;
    in response to a determination that the time gap is greater than a time threshold, transmitting the second packet to the destination device via a second port;
    estimate a first transmission time to a destination device associated with the first port;
    estimate a second transmission time to the destination device associated with the second port; and
    wherein the time threshold is (1) greater than, or equal to, a difference between the estimated first transmission time and the estimated second transmission time, if the second transmission time is less than the first transmission time or (2) a minimum time threshold if the estimated second transmission time is less than the estimated first transmission time.

12. The device of claim 11, wherein the processing circuitry is further to estimate the first transmission time includes estimating the first transmission time based on first attribute data.

13. The device of claim 12, wherein the first attribute data includes at east one of congestion information and queue depths along a transmission path.

14. The device of claim 11, wherein estimation of the first transmission time to the destination device associated with the first port based on first attribute data includes measuring a time between transmission of a packet to the destination device and receipt of an associated acknowledgement message.

15. The device of claim 11, wherein the processing circuitry is further to:
   estimate a second transmission time to the destination device associated with a second port of the source device; and
   in response to a transmission gap on the first port after transmission of the second packet that is greater than the estimated second transmission time, transmit a third packet to the destination device via the second port.

16. The device of claim 11, wherein the processing circuitry is further to:
   determine a time gap between the second packet and a third packet; and
   in response to a determination that the time gap is greater than a second time threshold, transmit the third packet to the destination device via the first port.

17. The device of claim 16, wherein, the processing circuitry is further to, in response to a determination that the second transmission time is less than the first transmission time, to set the second time threshold as a minimum time threshold, and, in response to a determination that the first transmission time is less than the second transmission time, to set the second time threshold to a difference between the second transmission time and the first transmission time.

18. The device of claim 15, wherein the processing circuitry, in response to a determination that the second transmission time is less than the first transmission time, to set the first time threshold to a difference between the estimated first transmission time and the estimated second transmission time.

19. The device of claim 11, wherein the processing circuitry is further to, in response to receiving an acknowledgment associated with the first packet and before the second packet has been transmitted over via the second port, transmit the second packet via the first port.

20. The device of claim 11, wherein the processing circuitry is further to, in response to receiving an acknowledgment on the first port and associated with the first packet and before the second packet has been transmitted via the second port, transmit the second packet via the first port.

* * * * *

UNITED STATES PATENT AND TRADEMARK OFFICE
CERTIFICATE OF CORRECTION

PATENT NO. : 10,819,643 B2
APPLICATION NO. : 16/282843
DATED : October 27, 2020
INVENTOR(S) : Connor et al.

Page 1 of 1

It is certified that error appears in the above-identified patent and that said Letters Patent is hereby corrected as shown below:

In the Claims

Column 14, Line 63, Claim 13, delete "east" and insert --least-- therefor

Signed and Sealed this
Twenty-first Day of December, 2021

Drew Hirshfeld
*Performing the Functions and Duties of the*
*Under Secretary of Commerce for Intellectual Property and*
*Director of the United States Patent and Trademark Office*